Feb. 6, 1968     A. G. ELLIS     3,367,617
WALL ATTACHMENT FOR MIRRORS
Filed March 11, 1966     2 Sheets-Sheet 1
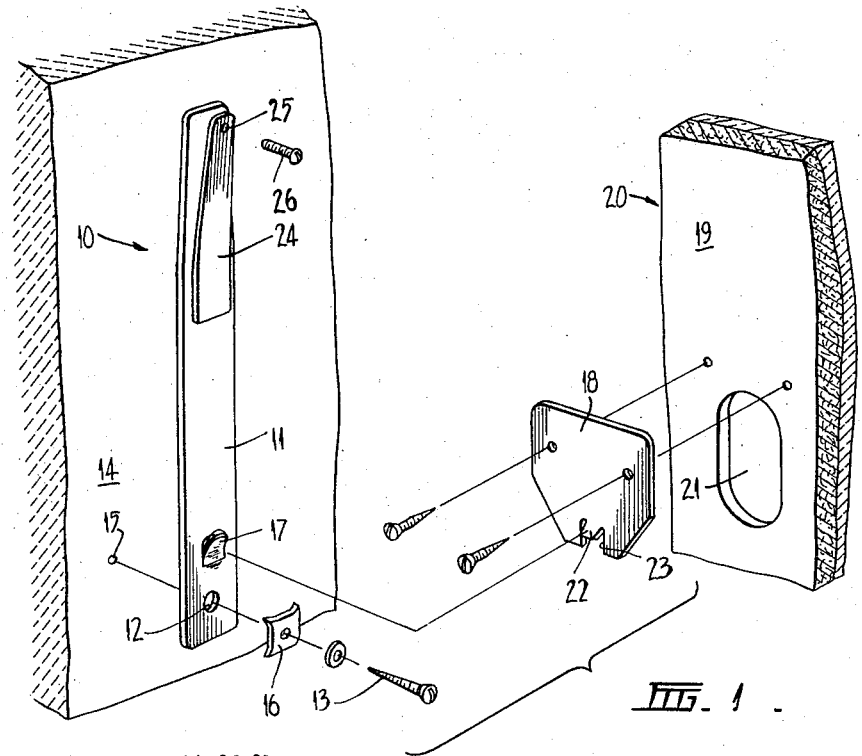
FIG. 1
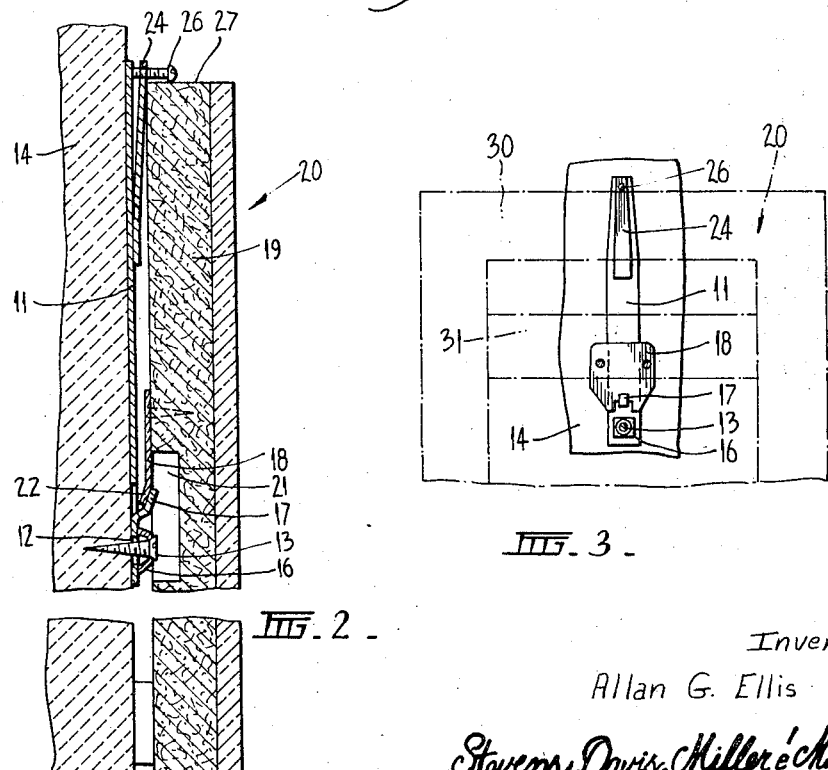
FIG. 2
FIG. 3
Inventor
Allan G. Ellis
Stevens, Davis, Miller & Mosher
Attorneys Feb. 6, 1968   A. G. ELLIS   3,367,617
WALL ATTACHMENT FOR MIRRORS
Filed March 11, 1966   2 Sheets-Sheet 2

Inventor
Allan G. Ellis

Stevens, Davis, Miller & Mosher
Attorneys

United States Patent Office 3,367,617
Patented Feb. 6, 1968

3,367,617
WALL ATTACHMENT FOR MIRRORS
Alan G. Ellis, 7 Canberra Grove, East Brighton, Victoria, Australia
Filed Mar. 11, 1966, Ser. No. 533,595
4 Claims. (Cl. 248—497)

ABSTRACT OF THE DISCLOSURE

A wall attachment for mirrors, comprising a plate member having a hole therein for a fixing device to secure the member to a wall and lug means formed integrally with said plate member and adapted to attach said mirror to said plate member. A tensioning plate is affixed to said plate member on the upper portion thereof, is adapted to overlie said plate member, and is provided adjacent its upper end with a hole and a spacing screw threadably engaged therein, whereby rotation of said spacing screw in one direction causes said tensioning plate to be moved away from said plate member and rotation of said screw in a counter direction causes the tensioning plate to be moved, under its own spring pressure, towards said plate member.

---

Figure 4:
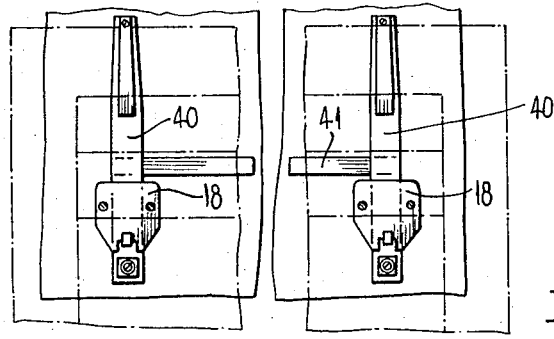

This invention relates to an improved wall attachment for mirrors, display boards, pictures or similar wall panels, and refers more particularly to an attachment for fastening to walls constructed of concrete masonry or timber framed and sheeted with linings of plaster board, hardboard and other like composition linings.

Apart from relatively small mirrors, pictures and other panels, larger units of this type of wall-mounted fittings require secure and adequate fixing means to support the weight to be supported and for which several methods are in common usage.

Wall mirrors are supported by chains or wire attached to a supporting plate secured to the wall or by mirror plates attached to the periphery of the mirror frame or backing, through which fixing screws are secured to the wall. In many applications of frameless mirrors, the mirror is detached from the backing which is then screw fixed to the wall and the mirror refixed to the backing with edge clips or screws through holes in the mirror. In some applications of framed mirrors where it is impractical to remove the mirror for separate fixing of the backing or frame, a form of support is used in which the heads of fixing screws fixed to the wall project and engage in slotted apertures in plates fixed to the framing. For other decorative and display panels and pictures, similar supporting methods are employed.

It is a requirement in a great number of applications that the mirror or display panel shall be firmly located in position parallel with the wall surface, for which purpose chain or wire support is unsuitable and the alternative fixed methods above-described are adopted. Each of these methods involve certain problems in practical application.

It is well known that in the case of concrete masonry and block walling of various types, it is difficult to drill or otherwise form holes for plugs and anchors at precise centres owing to the tendency of the drill or other percussive tool to drift due to the variation in density of the wall material and to the occurrence of joints, and the web structure of hollow block walls where such coincide with fixing centres. The displacement from centres is not usually of great magnitude but is often sufficient by misalignment to cause frame stress when fixing screws are tightened, and to eliminate the stress involved it is often necessary to ease and enlarge holes through the fixing medium.

The fixing of mirrors which are surface mounted to a backing frequently present difficulties when the mirror is detached from the backing, which is then screw fixed to the wall. When the wall surface is not a true plane alignment and the fixing screws are driven through the backing to a firm bearing, the backing is distorted and considerable labour is involved in the packing the backing to a true plane alignment to receive the mirror.

Now it is an object of the present invention to provide a wall attachment for mirrors or the like whereby precise positioning of the wall plugs is unnecessary and whereby the mirror or the like may readily be affixed to the attachment and to obviate problems arising from wall surfaces not in a true plane alignment, and to provide a firm attachment for mirrors so that displacement does not occur when cleaning the mirror surface, and to prevent removal of the mirror or panel from the supporting elements by the provision of a locking and tensioning screw.

Hereinafter, reference to mirrors includes mirrors, pictures or other similar wall decoration.

According to one broad form of the invention, a wall attachment for mirrors comprises a plate member having means for securing it to a wall, lug means attached to or formed integrally with said plate member and extending forwardly and upwardly therefrom, said plate being provided at an end remote from said lug means with a tensioning member, and means to vary the spacing between said plate member and said tensioning member.

Figure 5:
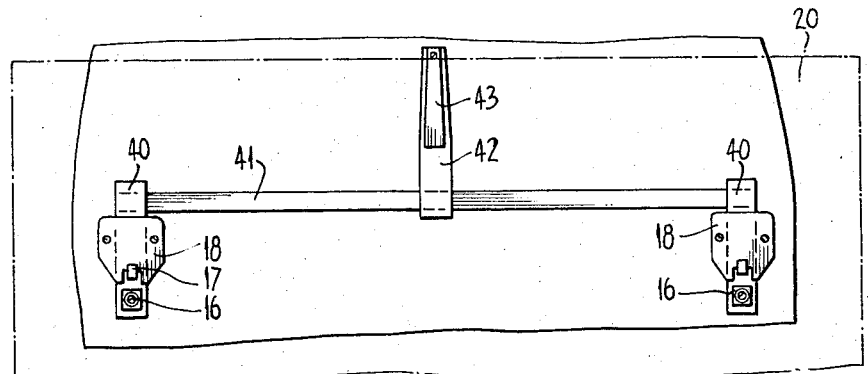
Figure 6:
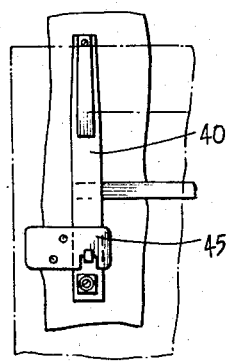
Figure 7:
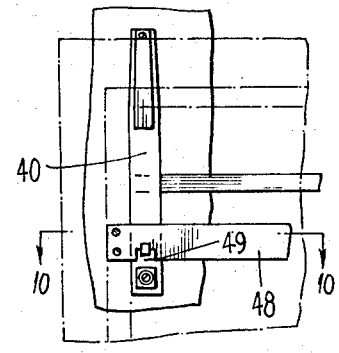
Figure 8:
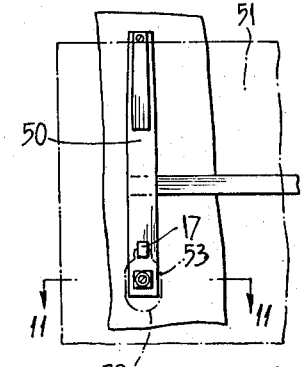
Figure 9:
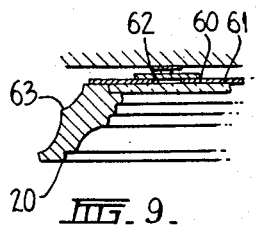
Figure 10:
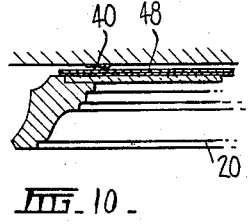
Figure 11:
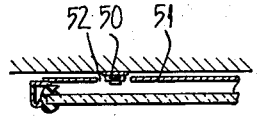

The invention will be more fully described with reference to the accompanying drawings illustrating preferred forms of the invention and wherein:

FIGURE 1 is an exploded perspective view of a mirror wall attachment according to the invention, FIGURE 2 is a sectional side elevational view showing the attachment of FIGURE 1 assembled, FIGURE 3 is an elevational view of the attachment of FIGURE 1 as attached to a framed particle board or plywood backing of small mirrors, FIGURE 4 is an elevational view of a modification of the invention showing two units of the type illustrated in FIGURE 1 connected by a spacing strip, FIGURE 5 is an elevational view of another embodiment of the invention wherein a pair of spaced supporting lugs are combined with a single tensioning plate, FIGURES 6 and 7 illustrate further modifications of the invention showing alternative means for fixing the plates to the mirror frame, FIGURE 8 illustrates the manner of attachment of metal backed-mirrors to a wall, FIGURE 9 illustrates in sectional plan view an alternative manner of fixing the attachment to mirrors having a backing panel of hardboard, plywood or the like, FIGURE 10 is a sectional plan view taken along line 10—10 of FIGURE 7, and FIGURE 11 is a sectional plan view taken along line 11—11 of FIGURE 8.

Referring firstly to FIGURES 1 and 2 of the drawings, a wall attachment for mirrors and the like comprises a wall plate 10 which may be cut and/or pressed from sheet steel or other suitable material. The plate 10 as described with reference to its position on a wall comprises a relatively narrow strip 11 having a hole 12 near the lower end thereof, whereby a fixing screw 13 may secure it to a wall 14. The diameter of the hole 12 is preferably much greater than that of the fixing screw 13 so that precise positioning of the hole 15 to be drilled or otherwise formed in the brickwork, mortar or the like is not necessary. A spring washer 16 prevents the screw from passing completely through the hole 12. The large size hole 12 and spring washer 16 permit a reasonable amount of adjustment of the plate 10 with respect to the hole 15 in the wall 14.

A lug 17 is pressed or stamped from the strip 11. The lug 17 extends forwardly and upwardly from the face of the strip 11 providing a hook for engagement with means on the back of a mirror. Such means are typically illustrated in FIGURE 1 by a spring plate 18 which is screwed to the hardboard backing 19 of a mirror 20. The backing 19 is provided with a recess 21 behind the plate 18 to permit ready and free engagement of the lug 17 with a tongue 22 on said spring plate 18. The tongue 22 is formed as an outwardly turned portion of the plate material and is situated at the base of a rectangular guide slot 23. In this manner the lug 17 is guided into co-engagement with the tongue 22.

A tension plate 24 is welded or otherwise suitably affixed to the plate 11 in the upper section thereof, said tension plate 24 being of a length substantially one third the length of the plate 11 and being secured to the plate 11 in such manner that the upper ends of said plates are substantially level. The tension plate 24 is fixed at its lower end only, thereby permitting the upper end to be fre to be moved towards or away from the plate 11. A hole 25 is formed near the upper end of the tension plate 24 and a screw 26 is threadedly engaged therein whereby rotation of the screw in a clockwise direction causes the tension plate 24 to be moved away from the plate 11 owing to the end of the screw abutting against the plate 11.

The length of the plate 10 and position of the spring plate 18 on the back of a mirror are such that when the lug 17 and tongue 22 are co-engaged the plate 11 and tension plate 24 extend beyond the upper edge 27 of the mirror 20 sufficiently to permit access to the head of the spacing screw 26.

The embodiment of the invention shown in FIGURE 3 is the same as that hereinbefore described with the exception that in order to attach the spring plate 18 to the mirror back when the mirror is backed by a rectangular surrounding or border frame 30 only, it is necessary to insert an additional frame cross-piece 31 to which the spring plate 18 is then attached. The spring plate 18 is attached to the cross-piece 31 in such manner that the tongue 22 is free of the cross-piece, thereby permitting the lug 17 to freely engage therewith.

When the mirror is of such width that a single wall attachment is insufficient to support it, an attachment of the type according to FIGURE 4 or 5 may be used. In each of the embodiments a pair of wall plates 40 are spaced apart by means of a horizontal spacer 41 which is welded or otherwise suitably affixed to each of said plates 40. The spring plates 18 are in each case affixed to the mirror backing at a spacing equivalent to the distance between the plates 40. The appropriate spacing for the plates 18 may be determined by placing the plate unit against the back of the mirror and marking the positions for the plates 18.

In the embodiment according to FIGURE 4, each of the plates 40 is constructed in accordance with the embodiment of FIGURES 1 and 2 hereinbefore described, the only difference being that the plates 40 are maintained in fixed spaced relationship by means of the spacer 41.

In the embodiment according to FIGURE 5, the plates 40 are constructed the same as the lower portion of the plate 11. That is, each plate 40 comprises a fixing hole 12 and lug 17. Attached to the spacer 41 at about the midpoint thereof is a plate 42 and tension plate 43 which are equivalent to the upper portion of plate 11 including the tension plate 24. The plates 42 and 43 are of such length as to extend slightly above the top edge of the mirror to permit the spacing screw 26 to be adjusted as hereinbefore described.

The embodiment of FIGURE 6 is similar to that of FIGURE 4, excepting that in this embodiment the spring plate 45 is attached to the side frame member 46 on the back of the mirror. The design of the plate 45 is slightly different from that of plate 18 as necessitated by the different manner of fixing but otherwise the principle is the same.

In the embodiment of FIGURES 7 and 10, the plate 18 is dispensed with as such and in lieu thereof a spring steel strip 48 is attached to the mirror frame at each side thereof, said strip 48 extending the full width of the mirror. The strip 48 is provided with tongues 49 similar to tongues 22 hereinbefore described. The tongues 49 are spaced along the strip 48 at distances equal to the spacing between plates 40. There may be associated plates 40 and tongues 49 at each side of the mirror, or there may be any number of additional plates and tongues spaced appropriately along the length of said strip 48.

The embodiment of FIGURES 8 and 11 illustrate the manner in which metal-backed mirrors are supported by the attachment according to the invention. The plate 50 may be of single type such as plate 11 of FIGURES 1 to 3 or may be of the multiple type according to FIGURES 4 or 5. In any case, the lug 17 engages a portion of the material 51 forming the backing for the mirror. The backing material 51 is cut away to form an opening 52 having a restricted upper section 53 for receiving and locating the lug 17. The mirror backing may be provided with one or a plurality of such openings 52 as considered necessary or desirable.

Referring now to the embodiment of FIGURE 9, this embodiment shows a method of fixing separate spring plates 60 to the mirror backing 61, which is usually of hardboard but is sometimes of plywood. Clearance holes 62 are formed in the backing material and the spring plates 60 are pop-rivetted and peened to ensure a secure fixing to the backing panel 61 which in turn is fixed by light brads or staples to the rebated mirror frame 63. This type of mounting is particularly suitable in the field of decorative mirrors, for which the slotted screw, wire or chain suspension has been the only type available.

In order to affix a mirror to a wall by means of the present invention, a hole or holes is/are drilled in the wall at a position approximating the position of the hole(s) in the plate 11 and plugs are inserted in the hole(s) if required. The plate 11 is then affixed to the wall by means of the fastening screw(s).

Where necessary, spring plates are fixed to the mirror backing at positions such as to permit the lug(s) 17 to engage the tongue(s) 22 on the spring plates.

A mirror is then placed on the plates 11 by reason of the lugs 17 and tongues 22 interengaging.

In the case of metal-backed mirrors, the apertures are formed therein in the upper portion of the backing plate and are spaced apart a distance corresponding to the spacing of the lugs.

In the case of wooden framed mirrors, metal straps or plates are affixed to the back thereof, said straps or plates having apertures therein for engagement with the lugs on thec ross member, as aforesaid.

When the mirror has been placed in position as aforesaid, the plate 11 and tension plate 24 extend upwardly sufficiently to permit the spacing screw 26 at the top of the plate 24 to be freely accessible. In this position the mirror is loosely mounted on the lugs and is capable of limited pivotal movement through the vertical plane.

In order to fix the mirror firmly in position, the spacing screw is tightened, thus causing the tension plate 24 to be forced away from said plate 11. By being moved away from the plate 11, the tension plate 24 abuts against the rear of the mirror near the top thereof, tilting the mirror slightly about the lugs and forcing the bottom of the mirror firmly against the wall. This also prevents the mirror from being moved out of position.

If desired, the lower portion of the back of the mirror may be provided with spacing blocks of a thickness substantially equal to the space left between the top edge of the mirror and the wall. In this way the mirror remains substantially vertical.

I claim:

1. A wall attachment for mirrors, comprising a plate member having a hole therein for a fixing device to secure said member to a wall, lug means depending forwardly and upwardly from said plate member near the lower end thereof when said plate member is affixed substantially vertically to a wall, said lug means being adapted to attach said mirror to said plate member, and a tensioning plate affixed to said plate member on the upper portion thereof, said tensioning plate being adapted to overlie said plate member and being affixed to said plate member at the lowermost portion of said tensioning plate, said tensioning plate being provided adjacent its upper end with a hole and a spacing screw threadably engaged therein, whereby rotation of said spacing screw in one direction causes said tensioning plate to be moved away from said plate member, and rotation of said screw in a counter direction causes the tensioning plate to be moved, under its own spring pressure, towards said plate member.

2. A wall attachment for mirrors, comprising a pair of plate members, a spacing member joining and retaining said plate members in fixed spaced relationship with each other, means to secure said plate members to a wall, lug means depending forwardly and upwardly from each of said plate members near the lower end thereof when said plate members are affixed substantially vertically to a wall, said lug means being adapted to attach said mirror to said plate member, and a tensioning plate affixed to each of said plate members on the upper portion thereof, each of said tensioning plates being adapted to overlie its corresponding plate member and being affixed to said plate member at the lowermost portion of said tensioning plates, each of said tensioning plates being provided adjacent its upper end with a hole and a spacing screw threadably engaged therein, whereby rotation of said spacing screws in one direction causes their corresponding tensioning plates to be moved away from their corresponding plate members, and rotation of said screws in a counter direction causes their corresponding tensioning plates to be moved, under their own spring pressure, towards their corresponding plate members.

3. A wall attachment for mirrors, comprising a plurality of plate members, at least one of which incorporates lug means depending forwardly and upwardly from the lower portion thereof when said plate members are affixed substantially vertically to a wall, said lug means being adapted to attach said mirror to said plate member; a spacing member joining said plate members together in an offset manner; and a tensioning plate overlying and affixed to at least one of said plate members at the lowermost portion of said tensioning plate, said tensioning plate being provided at its upper end with a hole and a spacing screw threadably engaged therein, whereby rotation of said spacing screw in one direction causes said tensioning plate to be moved away from its corresponding plate member, and rotation of said screw in a counter direction causes the tensioning plate to be moved, under its own spring pressure, towards its corresponding upper plate member.

4. A wall attachment as claimed in claim 3, wherein said plate members include an upper plate member and two lower plate members associated therewith, one of said lower plate members extending from either side of said upper plate member to form a substantially inverted T-shaped assembly.

References Cited

UNITED STATES PATENTS

| | | | |
|---|---|---|---|
| 881,661 | 3/1908 | Burnard | 248—490 |
| 1,908,147 | 5/1933 | Hoegger | 248—489 |
| 3,082,987 | 3/1963 | Robinson | 248—205 |
| 3,106,375 | 10/1963 | Donaldson | 248—4 |
| 3,138,359 | 6/1964 | Stewart | 248—495 |
| 3,176,943 | 4/1965 | Hughes | 248—490 |
| 3,222,018 | 12/1965 | Masters | 248—475 |

JOHN PETO, *Primary Examiner.*